(12) United States Patent
Mahriche

(10) Patent No.: US 12,227,363 B2
(45) Date of Patent: Feb. 18, 2025

(54) PLATFORM UNIT AND STORAGE SYSTEM INCLUDING THE SAME

(71) Applicant: Sami-Akram Mahriche, Laval (CA)

(72) Inventor: Sami-Akram Mahriche, Laval (CA)

( * ) Notice: Subject to any disclaimer, the term of this patent is extended or adjusted under 35 U.S.C. 154(b) by 81 days.

(21) Appl. No.: 18/069,845

(22) Filed: Dec. 21, 2022

(65) Prior Publication Data

US 2024/0109728 A1   Apr. 4, 2024

(30) Foreign Application Priority Data

Sep. 30, 2022 (GB) ..................................... 2214330

(51) Int. Cl.
| | | |
|---|---|---|
| *B65G 17/34* | (2006.01) | |
| *B65G 1/02* | (2006.01) | |
| *B65G 1/04* | (2006.01) | |
| *B65G 1/06* | (2006.01) | |
| *B65G 13/073* | (2006.01) | |
| *B65G 17/18* | (2006.01) | |
| *B65G 43/00* | (2006.01) | |
| *B65G 47/57* | (2006.01) | |
| *B65G 67/10* | (2006.01) | |
| *B62D 51/02* | (2006.01) | |

(52) U.S. Cl.
CPC ........... *B65G 17/345* (2013.01); *B65G 1/023* (2013.01); *B65G 1/026* (2013.01); *B65G 1/0478* (2013.01); *B65G 1/06* (2013.01); *B65G 13/073* (2013.01); *B65G 17/18* (2013.01); *B65G 43/00* (2013.01); *B65G 47/57* (2013.01); *B65G 67/10* (2013.01); *B62D 51/02* (2013.01)

(58) Field of Classification Search
CPC ...... B65G 17/345; B65G 1/023; B65G 1/026; B65G 1/0478; B65G 1/06; B65G 13/073; B65G 17/18; B65G 43/00; B65G 47/57; B65G 67/10; B65G 67/02; B65G 1/02; B65G 13/04; B65G 13/07; B65G 13/10; B65G 13/11; B62D 51/02
USPC ................................................ 198/789–791
See application file for complete search history.

(56) References Cited

U.S. PATENT DOCUMENTS

| | | | | |
|---|---|---|---|---|
| 3,752,339 A | * | 8/1973 | Sullivan ................. | B65G 47/54 414/807 |
| 4,205,746 A | * | 6/1980 | Olson ...................... | C03B 35/16 198/791 |
| 5,064,046 A | * | 11/1991 | Janotik ................. | B65G 1/0478 198/463.3 |
| 5,076,420 A | * | 12/1991 | Kuschel ............... | B65G 47/261 198/781.08 |
| 5,438,140 A | * | 8/1995 | Oftring .................... | C25D 3/18 546/180 |

(Continued)

FOREIGN PATENT DOCUMENTS

| | | |
|---|---|---|
| DE | 102019124537 | 3/2021 |
| DE | 102020128511 | 5/2022 |

(Continued)

*Primary Examiner* — Mark A Deuble

(57) ABSTRACT

A platform unit usable to support and move an item, comprising a base; a conveyor mounted to the base and operative for moving the item parallel to the base, the conveyor being pivotable about a pivot axis extending substantially perpendicular to the base; and a controller for selectively activating the conveyor and for selectively pivoting the conveyor about the pivot axis. Also, a storage system including many of the platform units.

16 Claims, 5 Drawing Sheets

(56) References Cited

U.S. PATENT DOCUMENTS

| | | | | |
|---|---|---|---|---|
| 5,556,246 | A * | 9/1996 | Broshi | B65G 13/10 414/273 |
| 5,707,199 | A * | 1/1998 | Faller | B65G 1/0478 414/21 |
| 6,158,574 | A * | 12/2000 | Williams | B65G 13/073 198/791 |
| 6,889,518 | B2 * | 5/2005 | Lane | A47F 3/0456 62/436 |
| 8,721,251 | B1 | 5/2014 | Razumov | |
| 9,334,113 | B2 | 5/2016 | Naylor | |
| 9,643,780 | B2 | 5/2017 | Salichs et al. | |
| 10,549,917 | B2 * | 2/2020 | Garehan | B65G 13/10 |
| 10,577,189 | B2 * | 3/2020 | Itoh | B65G 47/244 |
| 10,737,887 | B2 * | 8/2020 | Hosch | B65G 43/10 |
| 10,850,959 | B2 | 12/2020 | Goetz | |
| 10,906,739 | B2 * | 2/2021 | Gravelle | B65G 1/04 |
| 10,940,999 | B2 | 3/2021 | Kalouche | |
| 11,008,166 | B2 | 5/2021 | Gravelle et al. | |
| 11,220,400 | B2 | 1/2022 | Lisso | |
| 11,352,016 | B2 | 6/2022 | Austrheim | |
| 11,365,064 | B2 * | 6/2022 | Tachibana | B65G 59/12 |
| 11,524,845 | B2 * | 12/2022 | Enenkel | B07C 5/36 |
| 11,669,801 | B2 * | 6/2023 | Voloskov | G06Q 10/087 705/28 |
| 2005/0006205 | A1 * | 1/2005 | Kuo | H05K 3/0085 198/791 |
| 2005/0186053 | A1 * | 8/2005 | Itoh | B65G 1/0478 414/285 |
| 2008/0118337 | A1 * | 5/2008 | Vestergaard | B65G 41/008 414/340 |
| 2014/0014470 | A1 | 1/2014 | Razumov | |
| 2018/0032949 | A1 | 2/2018 | Galluzzo et al. | |
| 2019/0291956 | A1 * | 9/2019 | Pajevic | B66F 9/063 |
| 2020/0277137 | A1 | 9/2020 | Bastian, II et al. | |
| 2022/0041373 | A1 | 2/2022 | Ingram-Tedd et al. | |
| 2022/0153523 | A1 | 5/2022 | Bastian, II | |
| 2024/0051749 | A1 * | 2/2024 | Lundeen | B65G 13/07 |
| 2024/0076129 | A1 * | 3/2024 | Stark | B65G 1/0478 |

FOREIGN PATENT DOCUMENTS

| | | |
|---|---|---|
| EP | 3431416 | 4/2020 |
| EP | 1348646 | 4/2021 |
| EP | 3988482 | 4/2022 |
| FR | 3103367 | 1/2022 |
| WO | 2019238694 | 12/2019 |
| WO | 2019238697 | 12/2019 |
| WO | 2019238702 | 12/2019 |

* cited by examiner

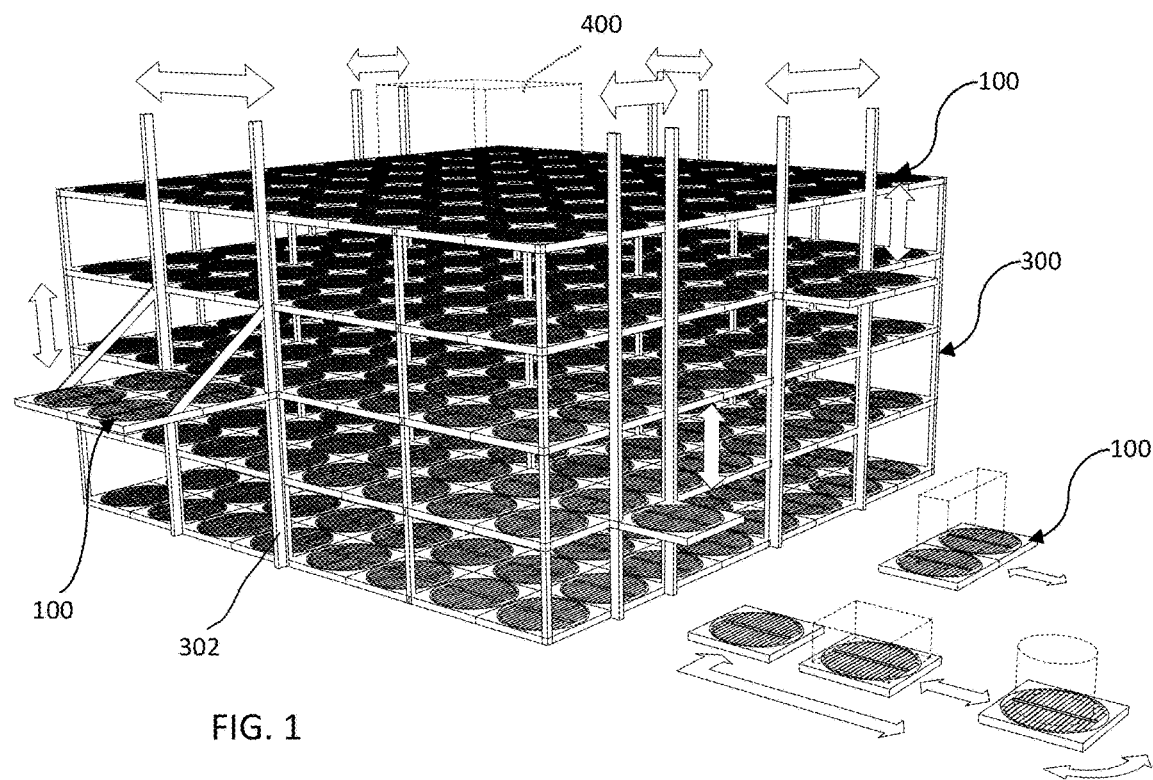
FIG. 1
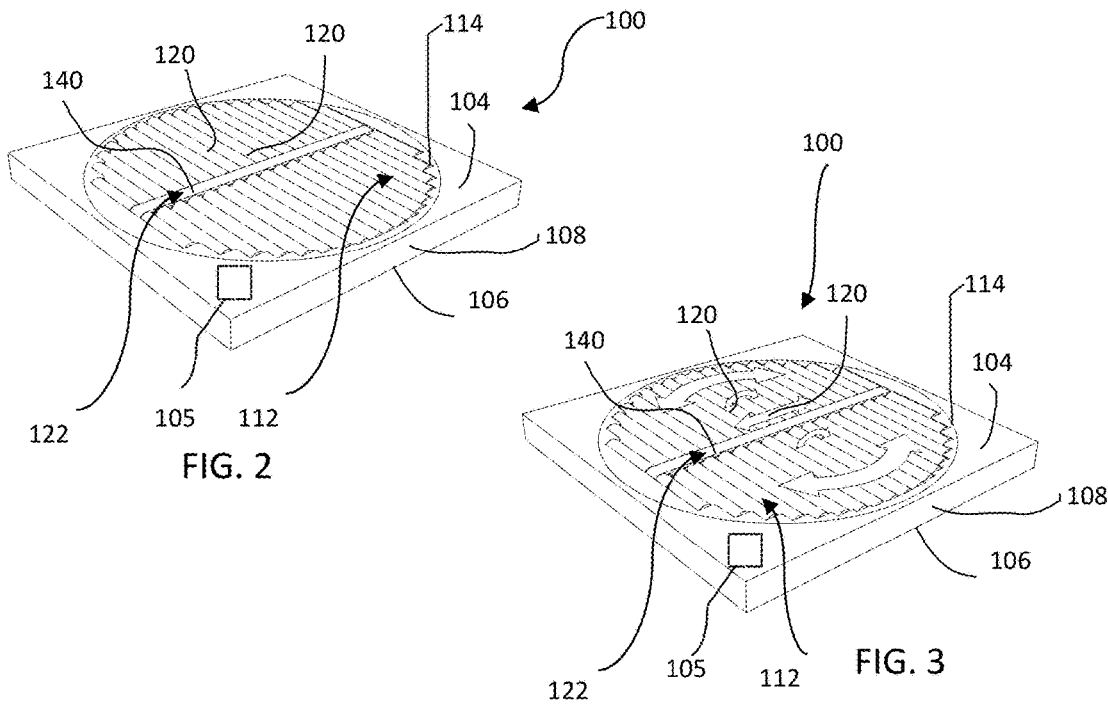
FIG. 2
FIG. 3

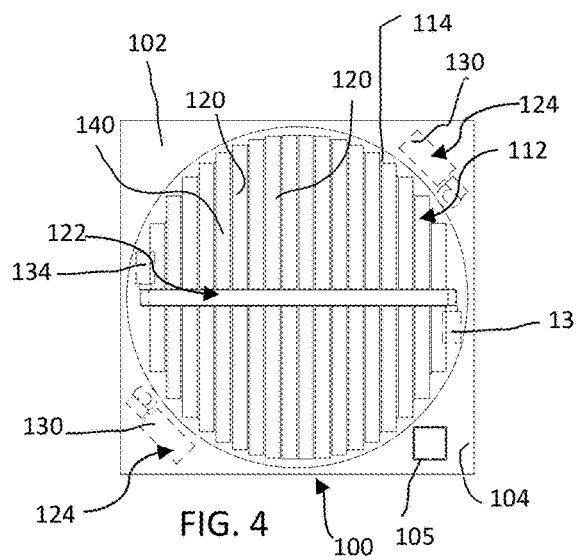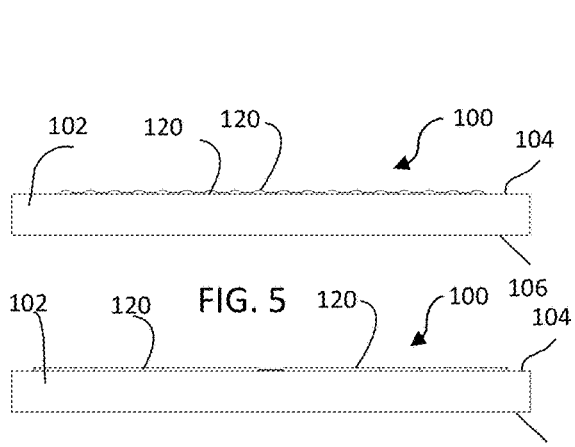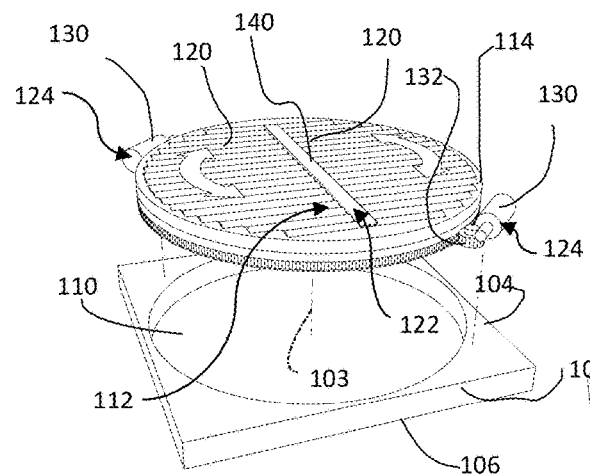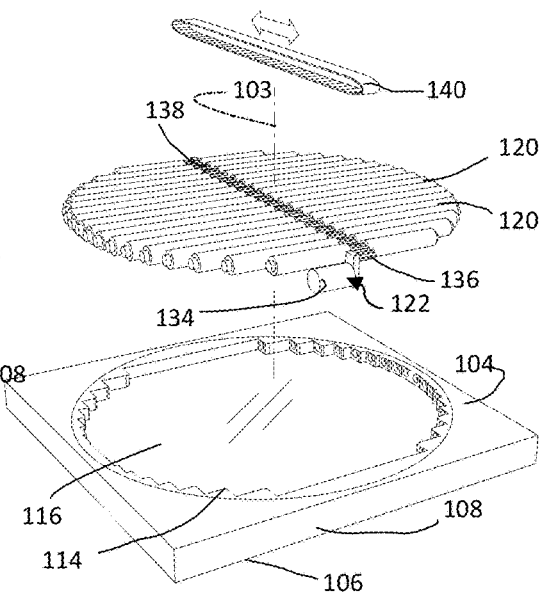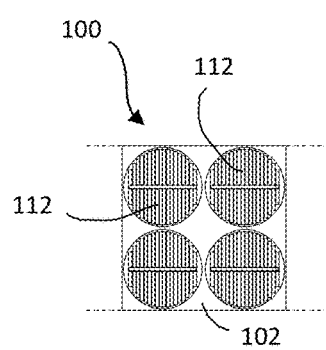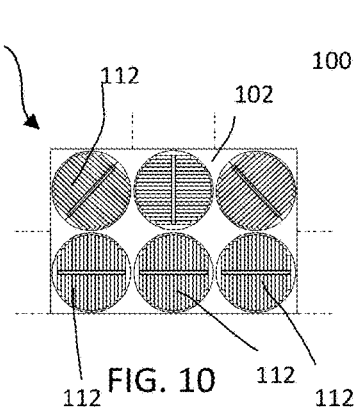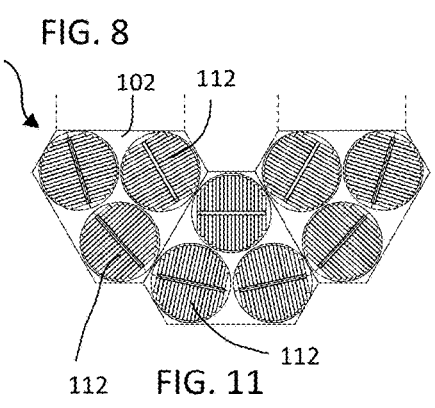

PLATFORM UNIT AND STORAGE SYSTEM INCLUDING THE SAME

FIELD OF THE INVENTION

The present invention relates to the general field of storage, and is more particularly concerned with a platform unit and a storage system including the same.

BACKGROUND

Automated three-dimensional storage structures, automated conveyor lines and autonomous handling vehicles are well known in the field of large storage and handling facilities of goods such as the ones used in the online shopping industry, in air freight shipping facilities in airports, in large and fully automated manufacturing facilities, and the likes. Currently used storage systems have many disadvantages. For example, these system typically use different automation technologies at a given location, and they generally do not share a large percentage of common automation components and parts for maintaining these systems in operating order. Thus, a relatively large and costly in-facility store for maintenance components is generally needed. Furthermore the installation costs of such different technologies in a same storage and handling facility generally imply additional costs attributed to the installation or custom developments of interface systems for enabling an integrated and fluid circulation of goods between the differently configured storage structures, conveyor lines, handling vehicles, and transport loading docks. Further operational costs must be attributed for training the warehouse personnel, and also for training, or otherwise hiring specialized maintenance personnel for keeping these automated system in operating order.

Thus, there is a need on the market for an improved storage system that avoids the aforementioned disadvantages. An object of the present invention is therefore to provides such systems.

SUMMARY OF THE INVENTION

In a broad aspect, there is provided a storage system for handling items, comprising: a plurality of platform units, a first subset of the plurality of platform units being provided substantially adjacent and substantially coplanar relative to each other; each platform unit including a base; a conveyor mounted to the base and operative for moving the items parallel to the base, the conveyor being pivotable about a pivot axis extending substantially perpendicular to the base; and a controller for selectively activating the conveyor to move the items and for selectively pivoting the conveyor about the pivot axis. The items can be selectively moved between the platform units by moving the items between adjacent ones of the platform units using the conveyors.

There may also be provided a storage system wherein a second subset of the plurality of platform units are substantially adjacent and substantially coplanar relative to each other vertically spaced apart an at least partially in register with at least part of the first subset, the storage system further comprising an elevator platform unit from the plurality of platform units movable vertically between the first and second subsets adjacent to both the first and second subsets.

There may also be provided a storage system wherein the conveyor includes a plurality of substantially parallel and substantially elongated rollers extending substantially perpendicular to the pivot axis and protruding upwardly from the base; and a roller actuator for selectively jointly axially rotating the rollers.

There may also be provided a storage system wherein the roller actuator includes a driving motor having an output shaft, the rollers being coupled to each other and to the output shaft through a driving belt engaging the driving shaft and the rollers so that the driving shaft and the rollers are jointly rotatable.

There may also be provided a storage system wherein the roller actuator includes a driving motor and an elongated worm rotatable by the driving motor, the rollers each including a gear engaging the worm so that rotating the driving motor jointly rotates the rollers.

There may also be provided a storage system wherein the roller actuator includes a driving motor and a driving gear rotatable by the driving motor, the driving gear engaging one of the rollers to that rotating the driving gear axially rotates the one of the rollers, the roller actuator further including coupling gears coupling adjacent rollers to each other so that rotating the one of the rollers entrains all the other rollers so that all the rollers are jointly rotatable.

There may also be provided a storage system wherein at least one of the platform units from the plurality of platform units is a mobile platform unit supported by wheels and including at least one motorized wheel selectively rotatable to advance the mobile platform unit on a surface.

There may also be provided a storage system wherein the mobile platform unit includes a handlebar protruding upwardly from the base for allowing an intended user to ride on the mobile platform unit while holding the handlebar.

There may also be provided a storage system wherein at least two of the platform units are mobile platform units, the mobile platform units being operative for moving in a coordinated fashion so as to keep a predetermined positional relationship relative to each other.

There may also be provided a storage system wherein the base is substantially square and wherein the first subset is arranged in a grid.

There may also be provided a storage system wherein two of the platform units selected from the plurality of platform units are provided above each other and coupled to each other through adjustable height columns allowing selective adjustment of a height between the two platform units.

There may also be provided a storage system wherein the base defines a cylindrical recess and wherein the conveyor includes a conveyor frame received in the recess and supporting the rollers.

There may also be provided a storage system further comprising a rotation actuator operatively coupled to the conveyor frame and to the base for rotating the conveyor frame relative to the base.

There may also be provided a storage system wherein the platform units are provided in a cargo area of a vehicle.

There may also be provided a storage system wherein at least one of the platform units is a multi-conveyor platform unit including an other conveyor mounted to the base and operative for moving the items parallel to the base, the other conveyor being pivotable about an other pivot axis extending substantially perpendicular to the base.

There may also be provided a storage system wherein the conveyor is substantially disc-shaped.

In another broad aspect, there is provided a platform unit usable to support and move an item, comprising a base; a conveyor mounted to the base and operative for moving the item parallel to the base, the conveyor being pivotable about a pivot axis extending substantially perpendicular to the base; and a controller for selectively activating the conveyor and for selectively pivoting the conveyor about the pivot axis.

Multiple platform units of the present invention may be advantageously used throughout a fully automated storage and distribution warehouse. Further advantageously, the use of the same platform unit throughout the warehouse consequently significantly reduces overall costs associated with spare parts, general maintenance, and training of employees operating the warehouse, comparatively to known automated equipment typically used for automating distribution warehouses and the like Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 1, in a perspective view, illustrates an embodiment of a platform unit, according to the present invention, here shown mounted in a three-dimensional racking structure provided with automated lifts, as well as used as autonomous transport handling vehicles;

FIG. 2, in a perspective view, illustrates an embodiment of the platform unit shown in FIG. 1;

FIG. 3, in a perspective view, illustrates the platform unit in FIG. 2, here showing the rotational movements of, respectively, a conveyor and of conveyor rollers thereof;

FIG. 4, in a top plan view, illustrates the platform unit in FIG. 2;

FIG. 5, in a side elevational view, illustrates the platform unit in FIG. 2, here showing a plurality of parallelly juxtaposed conveyor rollers as seen from an end view thereof along the top surface of the platform unit;

FIG. 6, in another side elevational view, illustrates the platform unit in FIG. 2 from a side perpendicular to the one shown in FIG. 5, so as to show the plurality of parallelly juxtaposed conveyor rollers as seen from a longitudinal side view thereof along the top surface of the platform unit;

FIG. 7, in a perspective exploded view, illustrates the platform unit in FIG. 2, here showing the circular roller conveyor spaced apart from a platform base;

FIG. 8, in a perspective exploded view, illustrates the platform unit in FIG. 2, here showing a conveyor roller assembly spaced apart from a circular conveyor support frame and the platform base;

FIG. 9 in a top plan view illustrates a first alternative embodiment of a platform unit according to the present invention;

FIG. 10 in a top plan view illustrates a second alternative embodiment of a platform unit according to the present invention;

FIG. 11 in a top plan view illustrates a third alternative embodiment of a platform unit according to the present invention;

Figure 12:
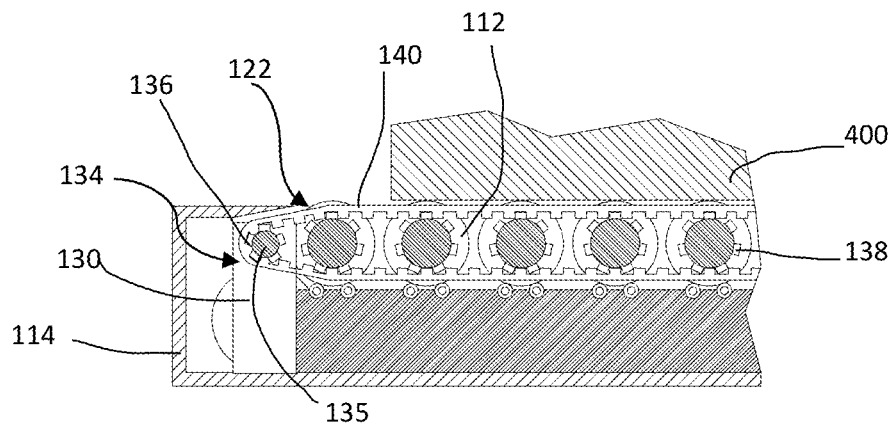
FIG. 12, in a side cutaway view, illustrates a conveyor actuator according to an embodiment of the invention usable in the platform unit of FIG. 2.

The present invention claims priority from UK patent application 2214330.9 filed Sep. 30, 2022, the contents of which is hereby incorporated by reference in its entirety.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "top", is used with reference to a typical use of the proposed platform unit in a level orientation with a conveyor thereof facing up. This terminology is used for convenience and should not be used to unduly restrict the scope of the present invention.

FIGS. 2 to 8 collectively illustrate an embodiment, according to the present invention, of a platform unit 100 universally usable for automating the storage, handling and transport of goods within, and between, a storage warehouse, loading docks, and transport vehicle cargo bays. The platform unit 100 comprises a platform base 102 and a conveyor 112 mounted to the platform base 102.

The platform base 102 has a substantially planar, plate like configuration extending horizontally. As illustrated for example in FIG. 7, the platform base 102 defines a platform upper side surface 104, an opposed a platform underside 106, and platform side edges 108 extending therebetween. The platform base 102 is typically substantially rigid so as to be usable as a load support platform, shelf or line conveyor component mounted in storage racking support structures 300, elevator lift platforms 302, line conveyors 304, cargo bays of transport vehicles 700, and the likes. Alternatively, the platform underside 106 of the platform base 102 may be configured to lay flat on support shelves in existing storage racking structures 300, on existing elevator lift platforms 302, on existing line conveyor support structures 304, in existing cargo bays of transport vehicles 700, and the likes. In some embodiments, the platform base 102 has a square configuration so that the platforms units may be arranged side-by-side in a grid, but other configurations are within the scope of the invention.

The platform base 102 further defines at least one platform base cavity 110 having a generally cylindrical configuration extending centrally and substantially inwardly downwardly relative to the platform upper side surface 104. Each of the at least one platform base cavity, or recess, 110 is located along the platform upper side surface 104 so as to be substantially proximally juxtaposed to any respectively adjacent platform side edge 108 and platform base cavity 110 included in the platform base 102.

The platform unit 100 further comprises one or more conveyors 112 in corresponding number relative to the at least one platform base cavity 110. In the present embodiment, the conveyors 112 are roller conveyors 112, but any other suitable type of conveyor 112, such as non-limitingly belt conveyors are usable in alternative embodiments. The conveyors 112 are typically substantially disc-shaped.

Each conveyor 112 includes a conveyor support frame 114 and conveyor rollers 120 mounted mounted thereto. The conveyor support frame 114 has as a substantially planar disk-like configuration extending horizontally. The conveyor support frame 114 defines a conveyor support frame upper side, a conveyor support frame underside and a circular side edge. The conveyor support frame 114 is rotably mounted centrally along a vertical axis in a respective one of the at least one platform base cavity 110 such that the conveyor support frame upper side is substantially coplanar with the platform upper side surface 104.

As best illustrated in FIG. 8, the circular conveyor support frame 114 further defines a conveyor support frame cavity 116 having a substantially circular periphery extending centrally and substantially inwardly downwardly relative to the conveyor support frame upper side. Each circular roller conveyor 112 received a plurality of elongated and substantially parallelly extending conveyor rollers 120. Each one of the conveyor rollers 120 has its opposed longitudinal ends rotably mounted along a respective inner peripheral portion of the conveyor support frame cavity 116.

Furthermore, each one of the conveyor rollers 120 has a suitably sized and configured diameter and length so as to cooperatively form a substantially disk shaped outer configuration extending coplanarly centrally relative to the conveyor support frame cavity 116 so as to fill substantially the whole of the conveyor support frame cavity 116. Furthermore, the parallelly extending conveyor rollers 120 have their respective upper peripheral surface portions that cooperatively define a horizontal plane that at least slightly parallelly protrudes above the platform upper side surface 104 such that a box of goods may freely roll on top of the conveyor rollers 120 without frictionally engaging the conveyor platform upper side surface 104. Thus, the conveyor 112 is operative for moving items parallel to the platform base 102 and is pivotable about a pivot axis 103 extending substantially perpendicular to the platform base 102 and to the conveyor rollers 120.

A roller actuator 122 is provided for selectively jointly axially rotating the conveyor rollers 120. The roller actuator 122 is capable of effecting a predetermined synchronous bidirectional rotation to the plurality of conveyor rollers 120 relative to the circular conveyor support frame 114.

The platform unit 100 further comprise one or more rotation actuator 124 in corresponding number with the circular roller conveyor(s) 112. Each one of the rotation actuator 124 is operatively coupled between the platform base 102 and a respective one of the circular conveyor support frame(s) 114. Each one of the conveyor rotation actuators 124 is capable of effecting a bidirectional rotation to the respective circular conveyor support frame 114 relative to the platform base 102.

With the platform unit 100 including only one circular roller conveyor 112, the latter typically has a diameter extending substantially the whole of the platform upperside surface 104, so as to minimize the distance relative to the circular roller conveyor(s) 112 of adjacent platform units 100, as illustrated in FIG. 4. With the platform unit 100 including more than one conveyor 112, each conveyor's 112 peripheral portions adjacent one or more platform side edges 108 is respectively in substantially close proximity there with, so as to minimize the distance between conveyor 112 of adjacent platform units 100, as illustrated in FIGS. 9, 10 and 11.

The platform unit 100 further comprises a controller 105 (shown only in FIGS. 2, 3 and 4) for selectively activating the conveyor(s) 112 to move items and for selectively pivoting the conveyor(s) 112 about the pivot axis 103. For example, the controller 105 includes a microcontroller mounted in the platform unit 100. The microcontroller is operatively connected to the roller and rotation actuators 124 and 122 and is capable of selectively actuating the latters.

Typically, the controller also includes wired or wireless network interface mounted in the platform unit 100. The network interface is in operative communication between the microcontroller and an external central control system of, for example, a distribution warehouse. The controller is electrically connected to an onboard or external electrical power source operatively powering the controller and the roller and rotation actuators 124 and 122.

As it will be exemplified through various applications examples described hereinafter, multiple platform units 100 of the present invention may be advantageously used throughout a fully automated storage and distribution warehouse to form a storage system. Further advantageously, the use of the same platform unit 100 throughout the warehouse consequently significantly reduces overall costs associated with spare parts, general maintenance, and training of employees operating the warehouse, comparatively to known automated equipment typically used for automating warehouses.

Figure 17:
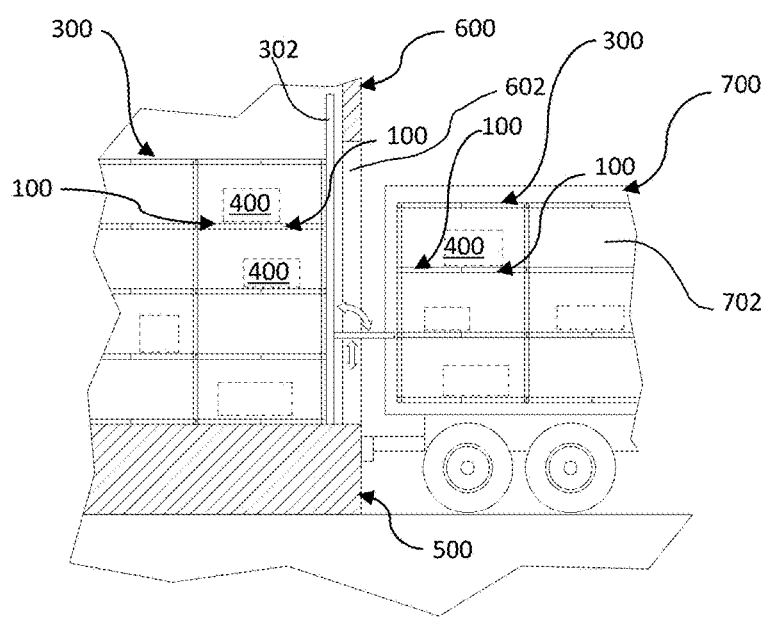
FIG. 17, in a side cutaway view, illustrates a loading dock interface between a storage racking structure in a warehouse and a storage racking structure in the cargo bay of a transport truck.

As exemplified in FIGS. 1 and 17, a plurality of platform units 100 may be provided substantially adjacent and substantially coplanar relative to each other. In addition, in some embodiments, some other platform units 100 may also be provided substantially adjacent and substantially coplanar relative to each other, but vertically spaced apart from the other coplanar platform units 100. Typically, the two or more tiers of platform units 100 are at least partially in register with each other. For example, the platform units 100 are horizontally mounted adjacent to one another and on multilevels in a substantially similar manner as would conventional static support platforms mounted in a typical storage racking structure 300.

Furthermore, some of the platform units 100 are elevator platform units 100 movable vertically between the tiers of the storage racking structure 300, for example by being mounted in elevator lift platforms, such as vertically and laterally mobile elevator lift platforms 302 moving along the vertical sides and ends of new or existing storage racking structures 300. Such mobile elevator lift platforms 302 are found in existing automated three-dimensional storage racking structures in large storage warehouse facilities. Furthermore, platform units 100 of the present invention may also be mounted in series to form linear line conveyors 304, as illustrated in FIG. 19.

The plurality of platform units 100 thus mounted in the storage racking structures 300, mobile elevator lift platforms 302 and line conveyors 304 may be electrically powered via an external electrical power source using known practices and norms in the industrial field.

Furthermore, the microcontroller of each automated platform is in operative communication with a central control system of the warehouse through wired and/or wireless communication links therewith. Such communications links are also well known in existing automated storage warehouses. This configuration is further described below.

Figure 19:
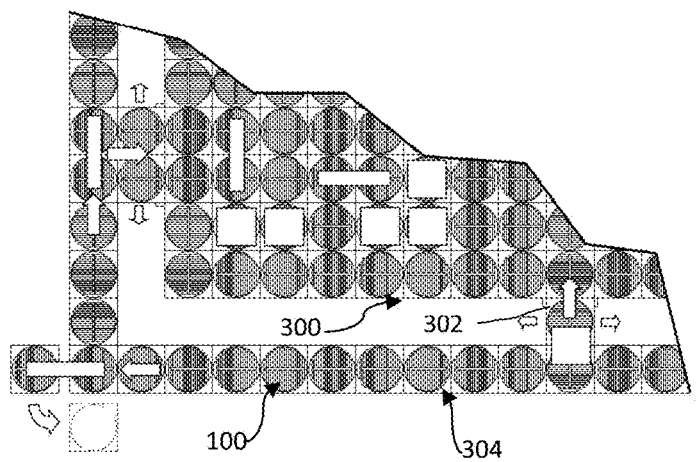
FIG. 19, in a top plan view, illustrates an automated conveyor line composed of a series platform units extending at right angle around a corner of a three-dimension storage structure equipped with automated lifts units.
Figure 20:
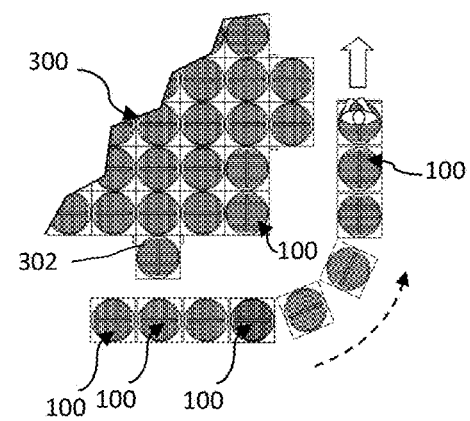
FIG. 20, in a top plan view, illustrates a series of wheeled platform units driven by an operator standing on the frontmost platform unit in the series.

As illustrated in FIGS. 1 and 19, in cooperation with a suitably configured software control system executed on warehouse servers and in the microcontroller of each platform unit 100, boxes or items of goods may be automatically moved and directed along the coplanar conveyors 112 mounted to form each level in a multilevel storage racking structure 300, also between the levels through the elevator lift platforms 302 and, finally, along line conveyors 304 represented by elongated series of juxtaposed platform units 100. Thus, items can be selectively moved from an initial platform unit 100 from all the platform units 100 to a final platform unit 100 from all the platform units moving the item between adjacent ones of the platform units 100 provided between the initial and final platform units 100. Thus, using multiple platform units 100 of the present invention, a warehouse may be completely automated for managing in real time the storage and movement of boxes and items of goods across the warehouse and loading docks 500 (as illustrated in FIG. 17).

Figure 16:
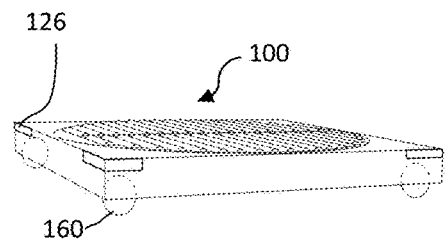
FIG. 16, in a perspective view, illustrates a mobile platform unit mounted on four drive wheels, according to an embodiment of the invention.

Although the rotation actuators 124 and roller actuators 122 of the platform unit 100 may be solely actuated on a predetermined time based actuation profile applied by the microcontroller, typically, the platform unit 100 further comprises a suitable arrangement of transducers, or sensors 126, as illustrated in FIG. 16. These sensors 126 are mounted at suitable locations on the platform unit 100, and are operatively connected to the microcontroller.

Figures 21, 22:
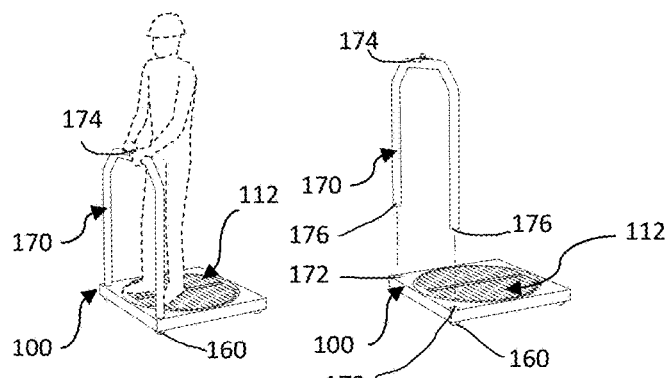
FIG. 21, in a perspective, exploded view, illustrates a platform unit, according to an embodiment of the invention, here shown provided with a removable handlebar and control interface assembly.
FIG. 22, in a perspective view, illustrates the platform unit in FIG. 21, here shown assembled and operated by a warehouse personnel.

As is well known in the art of industrial automated applications such as known automated storage racking and distribution systems, autonomous warehouse transport vehicles, and the likes, equipped with suitable sensor arrangements, the arrangement of sensors 126 in the present invention may non limitatively include linear and rotational encoders, capacitance, inductance and optic based proximity sensors, LIDAR's, limit switches, load cells, CCD\video camera based visual recognition systems, and the likes. The sensors 126 are suitably configured and sized for providing the microcontroller with real time information such as, but not limited to, the overall size, weight and relative position and orientation of, for example, a box of goods on, or about to be transferred on the respective platform unit 100. As it will be described further below, suitable sensors 126 mounted on mobile platform units 100 provided with drive wheels 160 (as illustrated in FIGS. 16, 21 and 22) may be used to transform the latter into an autonomous warehouse transport vehicle well known in the art of automated distribution warehouses. The sensors 126 may thus contribute to optimize the flow of boxes and items of goods 400 that oriented and moved along juxtaposed platform units 100.

In some embodiments of the invention, as illustrated in FIG. 7, the rotation actuator 124 is of the gear drive arrangement type and includes one or two motors and transmission assembly 130 mounted on opposed sides of the roller conveyor 112, and a toothed gear and toothed ring combination 132 around the circular roller conveyor 112. By powering the motor, the toothed gear rotates the toothed ring, which rotates the conveyor 112 about its pivot axis 103.

In some embodiments of the invention (not shown in the figures) the rotation actuator 124 includes instead a belt drive arrangement. The belt drive arrangement includes, in a similar fashion as the gear drive arrangement described above, one or two motors and transmission assembly 130 mounted on opposed sides of the circular roller conveyor 112. The difference residing in that the toothed gear and toothed ring combination 132 around the circular roller conveyor 112 is replaced with a pulley and drive belt combination.

In some embodiments of the invention, as illustrated in FIGS. 2, 3, 4, 8, and 12, the conveyor actuator is a belt drive arrangement. Referring more particularly to FIGS. 4 and 8, the belt drive arrangement includes one or two roller drive motor and transmission combinations 134 mounted along opposed inner peripheral portions of the circular conveyor support frame 114, and at least slightly below the circular conveyor support frame upper side. Each roller drive motor and transmission combination 134 includes a transmission output shaft 135 to which an output toothed gear 136 is mounted, having a rotation axis extending parallelly to the parallelly extending conveyor rollers 120.

Furthermore, each transmission output toothed gear 136 is located proximally and centrally transversally along opposed peripheral edge portions relative to the assembly represented by the parallelly extending plurality of conveyor rollers 120, and at least slightly below the circular conveyor support frame upper side.

The belt drive arrangement further includes a conveyor roller toothed gear 138 coaxially and longitudinally centrally mounted on each conveyor roller 120. Each conveyor roller toothed gear 138 has an outer diameter that is at least slightly smaller than the outer diameter of the respective conveyor roller 120.

The belt drive arrangement further includes a suitably sized and configured driving belt 140, which is in the embodiment shown in the drawings toothed, cooperatively engaged around the assembly of parallelly extending plurality of conveyor rollers 120 and the transmission output toothed gear(s) 136, so as to drivingly engage the latter's with diametrically opposed upper and lower toothed edge portions of each conveyor roller toothed gear 138.

Thus, the conveyor rollers 120 are coupled to each other and to the output shaft through the driving belt 140 engaging the driving shaft and the conveyor rollers 120, roller toothed gear 138, so that the driving shaft and the conveyor rollers 120 are jointly rotatable. The belt drive arrangement is therefore capable of effecting a predetermined synchronous bidirectional rotation to the plurality of conveyor rollers 120 relative to the circular conveyor support frame 114.

Figure 13:
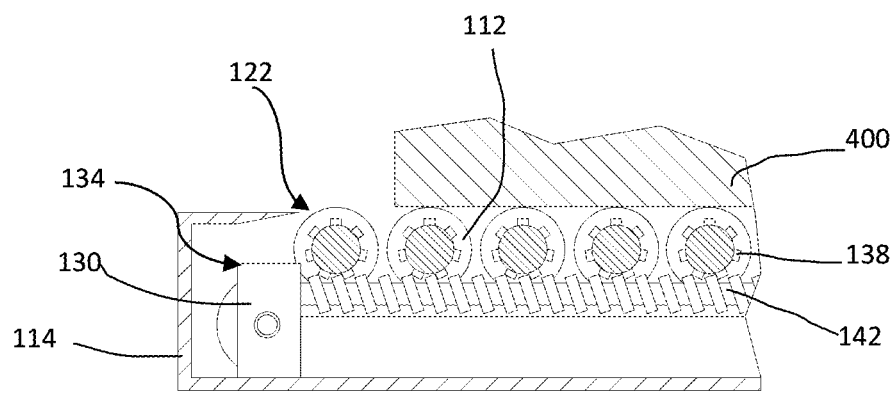
FIG. 13, in a side cutaway view, illustrates another conveyor actuator according to another embodiment of the invention.

In some embodiments of the invention, as illustrated in FIG. 13, the roller actuator 122 is an endless screw drive arrangement. The endless screw drive arrangement is partially similar to the belt drive arrangement described above. The differences reside in that the transmission output toothed gear 136 and toothed drive belt 140 of the belt drive arrangement are both replaced with a suitably sized and configured output worm 142. The output worm 142 is operatively driven by the one or two drive motor and transmission combinations 134 and extends longitudinally transversally relative to the assembly of parallelly extending plurality of conveyor rollers 120, so as to drivingly engage lower toothed peripheral edge portions of each conveyor roller toothed gear 138. Thus, the endless screw drive arrangement is capable of effecting a predetermined synchronous bidirectional rotation to the plurality of conveyor rollers 120 relative to the circular conveyor support frame 114.

Advantageously, due to the rotating axis at right angle between the endless screw 142 and the conveyor roller toothed gears 138, the endless screw drive arrangement includes an intrinsic breaking means that can be used to easily slow down a relatively heavy load 400 moving at high speed on the conveyor rollers 120 of serially juxtaposed platform units 100, by simply gradually lowering the electrical power applied to the motor and transmission combinations 134.

Figure 14:
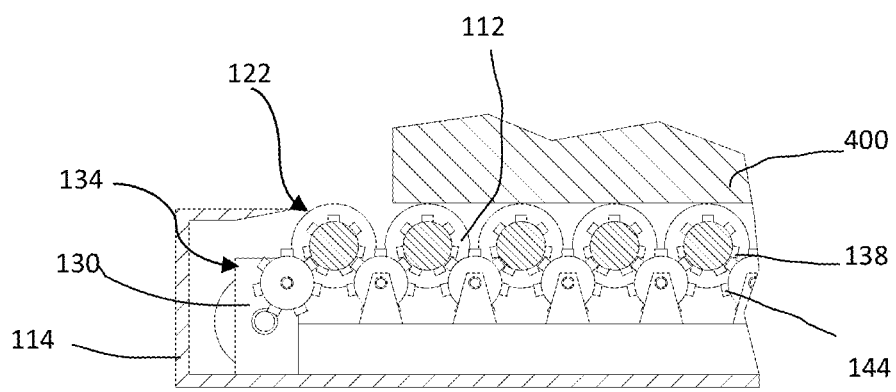
FIG. 14, in a side cutaway view, illustrates yet another conveyor actuator according to another embodiment of the invention.

In some embodiments of the invention, as illustrated in FIG. 14, the roller actuator 122 is a gear drive arrangement that is partially similar to the belt drive arrangement described further above. The difference resides in that the toothed drive belt 140 of the belt drive arrangement is replaced with a plurality of intermediate toothed coupling gears 144 rotably mounted on the circular conveyor support frame 114 so as to be proximally located underside the assembly of parallelly extending plurality of conveyor rollers 120. Each intermediate toothed coupling gear 144 is thus mounted parallelly coaxially relative to the conveyor rollers 120 and proximally below and between toothed peripheral edge portions of a respective pair of conveyor roller toothed gears 138, so as to be drivingly engaged with both gears 138 in the pair. Thus, the gear drive arrangement is capable of effecting a predetermined synchronous bidirectional rotation to the plurality of conveyor rollers 120 relative to the circular conveyor support frame 114.

In some embodiments, the platform base cavity 110 and roller conveyor 112 mounted therein extend substantially the whole of the platform upper side surface 104. Thus, the distance between the roller conveyors 112 of two adjacent platform units 100 is minimized. Consequently this configuration allows a substantially fluid and linear horizontal movement of, for example, a box of goods from one platform unit 100 to an adjacent one.

It is to be understood that the platform unit 100 may be suitably sized and configured for automating a particular storage application in the private sector, small enterprise, as well as large distribution warehouses. In some embodiments of the platform unit 100, the platform base 102 may have some or each of its corners defining a laterally inwardly extending recess that is suitably sized and configured for compatibly conforming to the transversal contour profile of the plurality of vertically extending support posts in the storage racking structure 300, as exemplified in FIG. 1. Thus, each platform unit 100 mounted to form the multi-storages level of the racking structure 300, may cooperatively form a seemingly unitary flat surface provided with contiguous circular roller conveyors 112.

In other exemplary embodiments of the platform unit 100 may be represented by the latter being sufficiently sized and configured for automating large storage racking structures specialized in the storage of products wrapped onto a standard four-by-four pallet. In this particular example, the platform unit 100 has its platform base 102 and circular roller conveyor 112 illustrated in FIG. 2 that are sufficiently dimensioned for allowing the warehouse pallet to freely rotate 360 degree on the platform unit 100.

In yet other exemplary embodiments, the platform unit 100 may have sufficiently small dimensions for use on the existing small shelves support structures in the back store of a small product enterprise.

As exemplified in FIGS. 9, 10 and 11, it is to be understood that the platform unit 100 may have other overall shape configurations than simply a basic square configuration, and include more than one roller conveyor 112 mounted there in. Variously shaped platform units 100 allow for the assembly of relatively complex storage racking structures and line conveyor installations in warehouses, as well as in transport cargo bays in trucks, ships and airplanes. Furthermore, it is contemplated that a series of platform units 100 of the present invention may be assembled in a low angle sloping line conveyor or vertically extending spiral line conveyor, for moving goods between floor levels of a storage warehouse and/or manufacturing facility.

Figure 15:
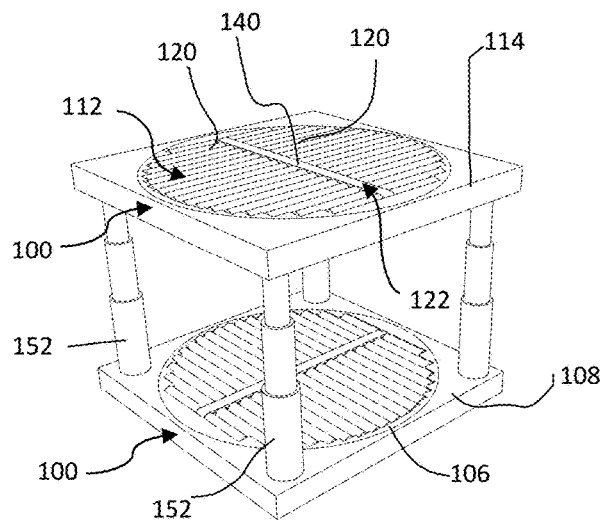
FIG. 15, in a perspective view, illustrates a bi-level platform unit, according to an embodiment of the invention.

In some embodiments of the invention, as illustrated in FIG. 15, a pair of superposed platform units 100 may be assembled to form a height adjustable bi- or multi-level platform assembly via suitably sized and arranged linear actuators such as hydraulic telescopic cylinders 152 or other adjustable height columns, mounted between the two platform units 100.

In some embodiments of the invention, as exemplified through FIGS. 1, 16, 20, 21 to 23 inclusively, at least some of the platform units 100 are mobile and mounted on typically four spaced apart wheels 160 located along the platform underside 106, and/or platform side edges 108 of the platform base 102. Two or more of the wheels 160 are drive wheels operatively connected to the microcontroller for operation thereof and to a locomotion motor, which may be integrated to the wheels 160 or operatively coupled thereto to rotate them. As exemplified in the figures, the wheels 160 may be spherical caster wheels or equivalent wheels having an upper portion thereof embedded in the platform underside 106. Other known wheel configurations, relative sizes, and mounting arrangements are also possible such as, but not limited to, all 360 degree caster wheels, a pair of 360 degree caster wheels and a pair of fixed axis wheels protruding under or along the sides of the platform side edges 108.

Figure 23:
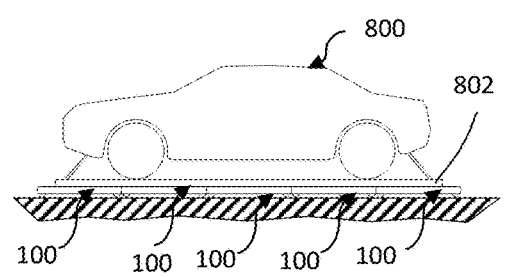
FIG. 23, in a side elevational view, illustrates multiple wheeled platform units such as the one illustrated in FIG. 16, here shown adjacent to one another so as to form a sufficiently large mobile platform for autonomously moving a vehicle attached on a rigid platform.

With the platform unit 100 thus provided with drive wheels 160, a suitable arrangement of sensors (as described further above), and wireless communication means, the platform unit 100 may be configured to autonomously transport goods 400 across the floor of the warehouse, or joined in groups of contiguously moving platform units 100 cooperatively acting as an extended platform unit 100 to autonomously move goods that are relatively larger than a single platform unit 100, as exemplified in FIGS. 1 and 23.

It is to be noted that the central and distributed software control systems, in cooperation with wireless communication means and suitable arrangements of sensors mounted on autonomous vehicles for moving goods along the floor of a warehouse, are already well known and implemented in existing warehouses.

FIG. 17 illustrates the platform unit 100 of the present invention mounted to form the support platform within a storage racking structure 300 located adjacent the door 602 of a loading dock 500 of a warehouse 600, in an elevator lift platform 302 attached to the storage racking structure 300, and in a storage racking structure 300 mounted in the cargo bay 702 of a vehicle, such as a transport truck 700, rear parked against the flush loading dock 500. Thus, advantageously, items, such as product boxes 400, can be autonomously exchanged between the warehouse 600 and the cargo bay 702 inside the transport truck 700 through the elevator lift platform 302 that automatically adjust the height of the elevator lift platform 302 between the two racking structures 300 of the warehouse 600 and transport truck 700 respectively. Furthermore, as illustrated, the one or more automated platforms 100 integrated in elevator lift platform 302 may be suitably configured so as to be pivotable upwardly in order for allowing the closing of the docking door 602.

It is to be understood that the same transfer arrangement through the use of platform units 100, may be implemented in a similar fashion between transport vehicles 700 such as 18-wheelers or freight trains, the loading docks and storage warehouse in a seaport or airport and, finally, the cargo bay of transport ships and airplanes. Thus a completely automated transport chain of goods may be implemented between a source and a final destination using a suitable arrangement of platform units 100.

Figure 18:
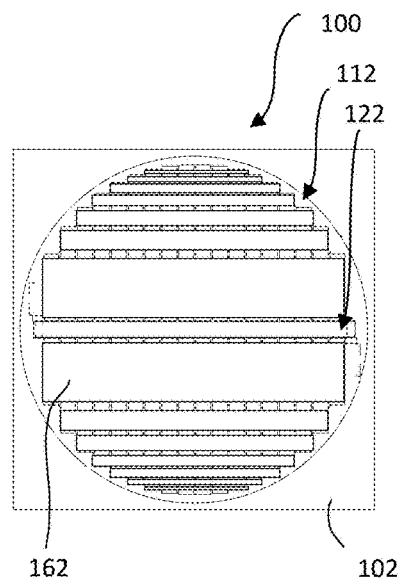
FIG. 18, in a top plan view, illustrates the platform unit in FIG. 4, here shown provided with suitably sized conveyor straps covering the conveyor rollers.

In some embodiments of the invention, as illustrated in FIG. 18, the roller conveyor 112 further includes a plurality of roller straps 162 suitably sized and configured for surrounding transversally corresponding end portions of same length conveyor rollers 120. Thus, substantially the whole support surface cooperatively formed by the conveyor rollers 120 are covered with the roller straps 162.

Referring to FIGS. 21 and 22, in some embodiments of the invention, the platform unit 100 mounted on drive wheels, as illustrated in FIG. 16, further comprises one or more selectively removable handle bars 170 that can be engaged in suitably located and sized engaging holes 172 defined along the platform upper side surface 104, as exemplified in the figures. The handle bar 170 is equipped with a user control interface 174 conveniently located along an upper portion thereof. The user control interface 174 may be a joystick type control interface or equivalent. Furthermore, the user control interface 174 may be battery powered and communicating wirelessly with the microcontroller of the platform unit 100. Alternatively, the user control interface 174 may be powered by the onboard power battery of the platform unit 100, and communicating with the microcontroller through a wired communication link via a suitable connector arrangement mounted within the engaging ends 176 of the handle bar 170 and engaging holes 172 of the platform unit 100. Advantageously, the handle bar 170 may be filled with a series of rechargeable lithium batteries for extending the travel range of the platform unit 100 when used as a user travel means. The platform unit 100 mounted on wheels 160 and equipped with the removable handle bar 170 may be used for personnel transportation across a large warehouse.

Furthermore, the platform unit 100 thus mounted on wheels 160 and driven by an operator may as well be used as a leading platform unit 100 followed by an elongated train of platform units 100 configured for autonomously following a preceding platform unit 100 in the train lineup so as to move in a coordinated fashion to keep a predetermined positional relationship relative to each other. Alternatively or concurrently, in some applications, the platform units 100 following one another in a train like configuration may be mechanically linked to one another via a suitable pull cable or towing bar (not shown in the figures). Thus, a percentage of onboard battery power may be saved when no load is transported.

Further advantageously, as illustrated in FIG. 23, a series of autonomously driven platform units 100 may be used to support and move relatively large loads such as, for example, a vehicle 800 attached on a rigid support platform 802.

Figure 24:
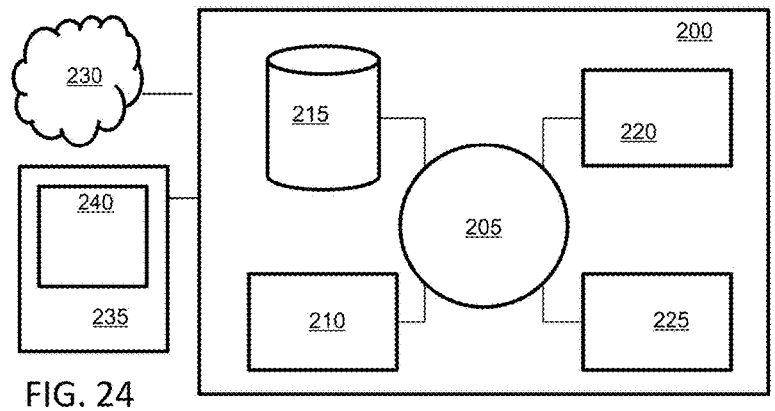
FIG. 24, in a schematic view, illustrates a computer system usable to control the platform units of FIG. 1.

In some embodiments, the platform units 100 are controlled by a computer system 200. An example of such a computer system 200 shown in FIG. 24. The computer system 200 is programmed or otherwise configured to send instructions to the platform units 100, and more specifically the controller 105, so that the latter can selectively control at least the conveyors 112 to activate the conveyor rollers 120 or rotate the conveyors about the pivot axis 103.

The computer system 200 includes a central processing unit (CPU, also "processor" and "computer processor" herein) 205, which can be a single core or multi core processor, or a plurality of processors for parallel processing. The computer system 200 also includes memory or memory location 210 (e.g., random-access memory, read-only memory, flash memory), electronic storage unit 215 (e.g., hard disk or solid state drive, among others), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 200 can in some embodiments be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 200, can implement a peer-to-peer network, which may enable devices coupled to the computer system 200 to behave as a client or a server. The interface 220 is also usable to send commands to the platform units 100 so that the latter can move items using the conveyors 112. In some embodiments, the interface 220 can also receive information from the conveyors 112, for example from the sensors 126. The controller 105 may also have a similar architecture, typically implemented in a low-cost computer or even a microcontroller, instead of having discrete chips and other components. The controller 105 also has components in its interface 220 suitable for delivering or controlling delivery of electrical power to the motor and transmission assemblies 130, and to the wheels 160 or their actuators when present.

The CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and writeback. The CPU 205 can be part of a circuit, such as an integrated circuit. One or more other components of the system 200 can be included in the circuit. In some cases, the circuit is an application specific integrated circuit (ASIC).

The storage unit 215 can store files, such as drivers, libraries and saved programs. The storage unit 215 can store user data, e.g., user preferences and user programs. The computer system 200 in some cases can include one or more additional data storage units that are external to the computer system 200, such as located on a remote server that is in communication with the computer system 200 through an intranet or the Internet. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can, in some embodiments, access the computer system 200 via the network 230.

Control of the platform units 100 is effected through executable code stored on an electronic storage location of the computer system 200 (and of the controller 105), such as, for example, on the memory 210 or electronic storage unit 215. The machine executable or machine readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processor adapted to execute the code, or can be compiled during runtime. The code can be supplied in a programming language that can be selected to enable the code to execute in a pre-compiled or as-compiled fashion. The code may provide a user interface allowing commands to be entered, and a control module controlling the dedicated interface, for example in the form of a device driver.

Aspects of the computer system 200 can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement databases. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 200 can include or be in communication with an electronic display 235 that comprises a user interface (UI) 240 for providing, for example, controls corresponding to the various operations that can be performed on the items 400 stored in the storage unit. In other embodiments, movements of the items is instead determined through commands received from the interface 220 or from a database. Examples of UI's include, without limitation, a graphical user interface (GUI) and web-based user interface.

Non-limiting example of algorithms that may implemented in code executed by the computer system 200 to determine how to move the items 400 in the storage structure 300 include the A* algorithms with the storage structure 300 represented by a graph. The graph may represent the platform units 100 that are free (available to receive an item 400) as vertices, and their relationship as edges, with edges linking for example platform units 100 that can be reached by an item through transfer between adjacent platform units 100. If no path exists between two given platform units 100, such as would be the case with a high occupancy storage structure 300, other items 400 may be moved to create such a path. The Dijkstra algorithm may be used if a shortest path is desired. In some embodiments, the computer system 200 may use a Simultaneous localization and mapping (SLAM) algorithm to map an environment in which the items 400 are to be moved.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:
1. A storage system for handling items, comprising:
a plurality of platform units, a first subset of the plurality of platform units being provided substantially adjacent and substantially coplanar relative to each other;

each platform unit including
a base;
a conveyor mounted to the base and operative for moving the items parallel to the base, the conveyor being pivotable about a pivot axis extending substantially perpendicular to the base; and
a controller for selectively activating the conveyor to move the items and for selectively pivoting the conveyor about the pivot axis;
whereby the items can be selectively moved between the platform units by moving the items between adjacent ones of the platform units using the conveyors;
wherein two of the platform units selected from the plurality of platform units are provided above each other and coupled to each other through adjustable height columns allowing selective adjustment of a height between the two platform units.

2. The storage system as defined in claim 1, wherein a second subset of the plurality of platform units are substantially adjacent and substantially coplanar relative to each other vertically spaced apart an at least partially in register with at least part of the first subset, the storage system further comprising an elevator platform unit from the plurality of platform units movable vertically between the first and second subsets adjacent to both the first and second subsets.

3. The storage system as defined in claim 1, wherein the conveyor includes
a plurality of substantially parallel and substantially elongated rollers extending substantially perpendicular to the pivot axis and protruding upwardly from the base; and
a roller actuator for selectively jointly axially rotating the rollers.

4. The storage system as defined in claim 3, wherein the roller actuator includes a driving motor having a driving shaft, the rollers being coupled to each other and to the driving shaft through a driving belt engaging the driving shaft and the rollers so that the driving shaft and the rollers are jointly rotatable.

5. The storage system as defined in claim 3, wherein the roller actuator includes a driving motor and an elongated worm rotatable by the driving motor, the rollers each including a gear engaging the worm so that rotating the driving motor jointly rotates the rollers.

6. The storage system as defined in claim 3, wherein the roller actuator includes a driving motor and a driving gear rotatable by the driving motor, the driving gear engaging one of the rollers to that rotating the driving gear axially rotates the one of the rollers, the roller actuator further including coupling gears coupling adjacent rollers to each other so that rotating the one of the rollers entrains all the other rollers so that all the rollers are jointly rotatable.

7. The storage system as defined in claim 1, wherein at least one of the platform units from the plurality of platform units is a mobile platform unit supported by wheels, the wheels including at least one motorized wheel selectively rotatable to advance the mobile platform unit on a surface.

8. The storage system as defined in claim 7, wherein the mobile platform unit includes a handlebar protruding upwardly from the base for allowing an intended user to ride on the mobile platform unit while holding the handlebar.

9. The storage system as defined in claim 7, wherein at least two of the platform units are mobile platform units, the mobile platform units being operative for moving in a coordinated fashion so as to keep a predetermined positional relationship relative to each other.

10. The storage system as defined in claim 1, wherein the base is substantially square and wherein the first subset is arranged in a grid.

11. The storage system as defined in claim 3, wherein the base defines a cylindrical recess and wherein the conveyor includes a conveyor frame received in the recess and supporting the rollers.

12. The storage system as defined in claim 11, further comprising a rotation actuator operatively coupled to the conveyor frame and to the base for rotating the conveyor frame relative to the base.

13. The storage system as defined in claim 1, wherein the platform units are provided in a cargo area of a vehicle.

14. The storage system as defined in claim 1, wherein at least one of the platform units is a multi-conveyor platform unit including an other conveyor mounted to the base and operative for moving the items parallel to the base, the other conveyor being pivotable about an other pivot axis extending substantially perpendicular to the base.

15. The storage system as defined in claim 1, wherein the conveyor is substantially disc-shaped.

16. A storage system for handling items, comprising:
a plurality of platform units, a first subset of the plurality of platform units being provided substantially adjacent and substantially coplanar relative to each other;
each platform unit including
a base;
a conveyor mounted to the base and operative for moving the items parallel to the base, the conveyor being pivotable about a pivot axis extending substantially perpendicular to the base; and
a controller for selectively activating the conveyor to move the items and for selectively pivoting the conveyor about the pivot axis;
whereby the items can be selectively moved between the platform units by moving the items between adjacent ones of the platform units using the conveyors
wherein at least one of the platform units from the plurality of platform units is a mobile platform unit supported by wheels, the wheels including at least one motorized wheel selectively rotatable to advance the mobile platform unit on a surface, the mobile platform unit including a handlebar protruding upwardly from the base for allowing an intended user to ride on the mobile platform unit while holding the handlebar.

* * * * *